US00RE50113E

(19) United States
(12) Reissued Patent
Mizhar

(10) Patent Number: US RE50,113 E
(45) Date of Reissued Patent: Sep. 3, 2024

(54) REVERSE ACCESS METHOD FOR SECURING FRONT-END APPLICATIONS AND OTHERS

(71) Applicant: SAFE-T DATA A.R LTD., Herzliya Pituach (IL)

(72) Inventor: Amir Mizhar, Modiin (IL)

(73) Assignee: NetNut, Ltd., Tel Aviv-Jaffa (IL)

(21) Appl. No.: 16/838,401

(22) Filed: Apr. 2, 2020

Related U.S. Patent Documents

Reissue of:
(64) Patent No.: 9,935,958
Issued: Apr. 3, 2018
Appl. No.: 14/379,305
PCT Filed: Feb. 13, 2013
PCT No.: PCT/IL2013/000017
§ 371 (c)(1),
(2) Date: Aug. 18, 2014
PCT Pub. No.: WO2013/121410
PCT Pub. Date: Aug. 22, 2013

(30) Foreign Application Priority Data

Feb. 19, 2012 (IL) ..... 218185

(51) Int. Cl.
*H04L 29/06* (2006.01)
*G06F 21/60* (2013.01)
*H04L 9/40* (2022.01)

(52) U.S. Cl.
CPC ..... *H04L 63/10* (2013.01); *G06F 21/60* (2013.01); *H04L 63/0209* (2013.01); *H04L 63/029* (2013.01)

(58) Field of Classification Search
CPC ... H04L 63/029; H04L 63/10; H04L 63/0209; H06F 21/60
See application file for complete search history.

(56) References Cited

U.S. PATENT DOCUMENTS 6,470,386 B1 10/2002 Combar et al.
7,181,493 B2 2/2007 English et al.
(Continued)

FOREIGN PATENT DOCUMENTS

CN 1731786 A 2/2006
EP 1324565 A1 * 7/2003 ..... G06F 21/62
(Continued)

OTHER PUBLICATIONS

Forrester Research, 2012, "The Complete File-Transferring Protection Suit"; 2 pages.
(Continued)

*Primary Examiner* — Ovidio Escalante
(74) *Attorney, Agent, or Firm* — Finnegan, Henderson, Farabow, Garrett & Dunner LLP

(57) ABSTRACT

A System that provides a secured connection between servers on the LAN and clients on the WAN comprises the LAN (which includes LAN Server and LAN Controller) and the DMZ (which includes DMZ Server and DMZ Stack Pool Service). Wherein the Client Request reaches the DMZ Server it stores it in the DMZ Stack Pool Service and the LAN Controller establishes outbound TCP based connection to the DMZ Stack Pool Service that passes the Client Connection Information to the LAN Server via the LAN Controller. Then the LAN Server then generates a connection between the Service and DMZ Server.

14 Claims, 1 Drawing Sheet

Amended

(56) References Cited

U.S. PATENT DOCUMENTS

| | | | | |
|---|---|---|---|---|
| 7,707,628 | B2 | 4/2010 | Saito | |
| 2003/0204613 | A1* | 10/2003 | Hudson | D01D 5/423 709/231 |
| 2005/0240994 | A1* | 10/2005 | Burcham | H04L 63/0209 726/15 |
| 2006/0031929 | A1* | 2/2006 | Saito | H04L 63/029 726/11 |
| 2006/0200547 | A1* | 9/2006 | Edwards | H04L 41/28 709/224 |
| 2007/0050843 | A1* | 3/2007 | Manville | H04L 29/06027 726/12 |
| 2009/0064307 | A1* | 3/2009 | Holar | H04L 63/0209 726/12 |
| 2010/0131616 | A1* | 5/2010 | Walter | H04L 63/0209 709/219 |

FOREIGN PATENT DOCUMENTS

| | | |
|---|---|---|
| EP | 2031817 | 3/2009 |
| EP | 2031817 A1 | 3/2009 |

OTHER PUBLICATIONS

TCP/IP Networking an Example, May 25, 2002, CS 458 Slides, University of Virginia, pp. 1-12.*

International Search Report from PCT Application No. PCT/IL2013/000017.

First Office Action from the Israel Patent Office for Israeli Patent Application No. 218185 dated Jul. 12, 2015.

Second Office Action from the Israel Patent Office for Israeli Patent Application No. 218185 dated Jun. 4, 2017.

The First Office Action for Chinese Application No. 201380020710.4, SIPO, dated Sep. 21, 2016.

The Second Office Action for Chinese Application No. 201380020110.4, SIPO, dated Feb. 21, 2017.

The Third Office Action for Chinese Application No. 201380020710.4, SIPO, dated Jun. 13, 2017.

Fourth Office Action for Chinese Patent Application No. 2013800207104, SIPO, dated Nov. 28, 2017.

* cited by examiner

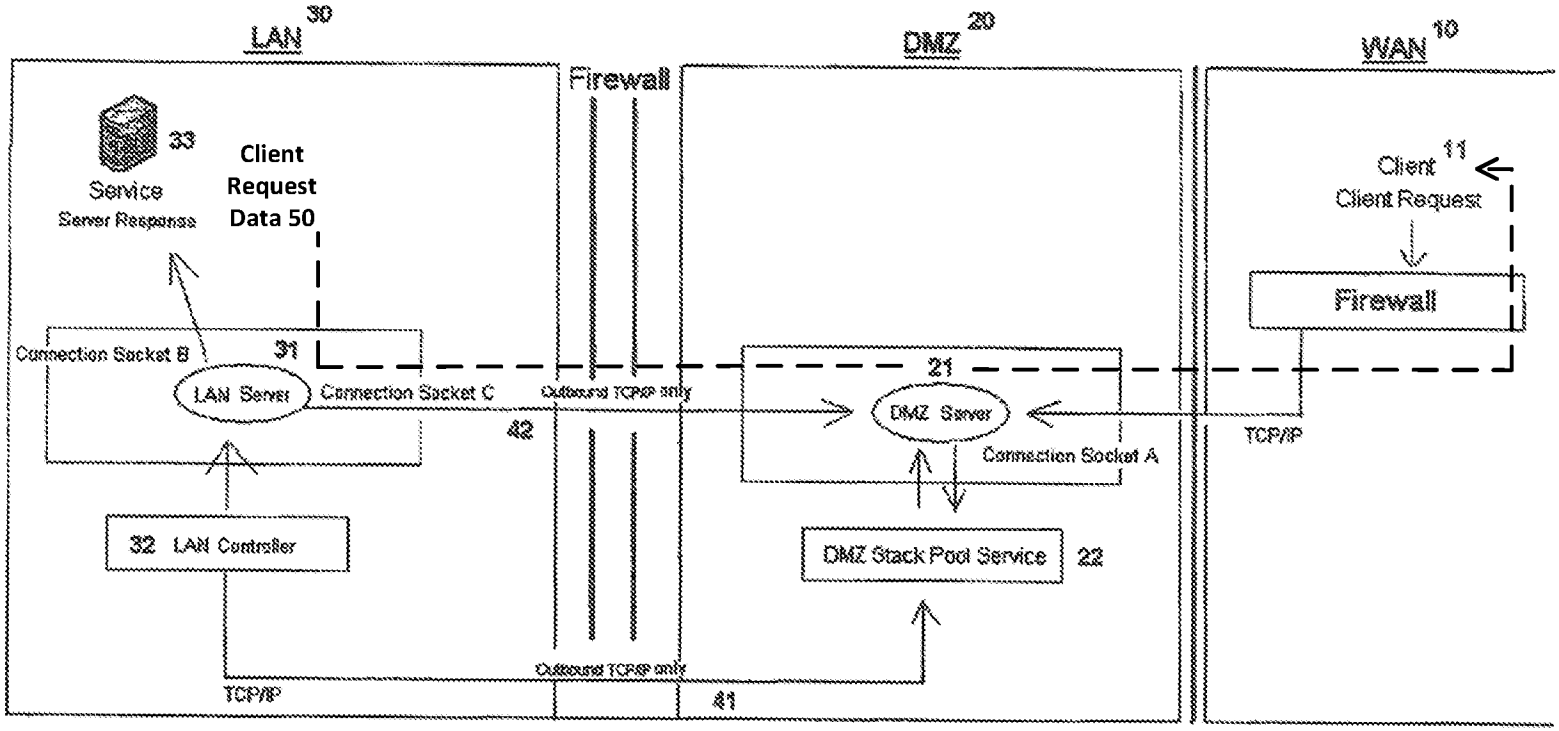
Amended

REVERSE ACCESS METHOD FOR SECURING FRONT-END APPLICATIONS AND OTHERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 9,935,958, issued on Apr. 3, 2018, which is the National Stage of International Application No. PCT/IL2013/000017 having a filing date of Feb. 13, 2013, which claims foreign priority from Israeli Application No. 218185 having a filing date of Feb. 19, 2012. The disclosures of the above-referenced applications are expressly incorporated herein by reference in their entireties.*

The following is an invention for securing electronically stored data, the computer on which the data resides on and the communications of the computer with its computer network.

BACKGROUND ART

It is a well-known fact that the computers in an organization's internal network (also known as the local area network or LAN) which provide services to users outside of the organization are highly prone to attacks from external hackers and malicious code. Due to this risk, it is a common practice to protect the LAN by placing external-facing computers in a segregated sub-network and thereby shield the rest of the network in case of an attack. This sub-network is commonly known as the DMZ (or De-Militarized Zone). Any computer running programs that provide services to users outside of the [organization^] *organization's* internal network can be placed on the DMZ. The most common type of computers are web servers, email servers, FTP servers and VoIP servers. Since the DMZ is a sub-network that contains the organization's external services to a larger untrusted network (usually the Internet), potential hackers and malicious code may gain access to the DMZ, but rarely do they gain access to the LAN. The computers on the DMZ have limited connectivity to the computers on the LAN and are usually separated by a firewall that controls the traffic between the DMZ computers and the LAN computers. The DMZ can be seen as an additional layer of security to the LAN.

Organizations that have Internet portals which enable communications with the general public via the Internet are vulnerable to infiltration from the outside. Therefore, many of these organizations establish a DMZ to protect their sensitive data and to reduce the ability of hackers to infiltrate the LAN. The ways and methods under which the DMZ works is known to any expert in the field, and therefore there is no need to describe them here in further detail.

Establishing a DMZ requires the duplication of relevant data and computer programs so they can reside on both the DMZ computers and on the LAN computers. This duplication of data and computer programs has several drawbacks. It can be costly to purchase additional licenses required to install multiple instances of the same computer program on both the LAN and on the DMZ. Supporting and managing duplicate computer programs and data on the LAN and on the DMZ can be costly and difficult. Furthermore, since the DMZ interfaces with the external systems, the data on the DMZ is vulnerable to hacking attacks and external malicious code.

The following invention aims to overcome these disadvantages and to provide an efficient system for protecting the data on the LAN.

DESCRIPTION OF THE DRAWINGS

The intention of the drawings attached to the application is not to limit the scope of the invention and its application. The drawings are intended only to [5] illustrate the invention and they constitute only one of its many possible implementations.

FIG. 1 describes the System that includes the LAN (30) which includes the Service (33), the LAN Server (31) and the LAN Controller (32)[; The], *the* DMZ (20) [5] which includes the DMZ Server (21), the DMZ Stack Pool Service (22)[;], and the WAN (10)[;], and the connections between these components.

THE INVENTION

As described above, there is a strong need for a computer system that enables users to communicate with the LAN and in the same time protects the LAN from external threats. The following invention provides an efficient solution for the issues that are mentioned above.

The present invention provides a System for securing the data and the hosts that reside in the LAN and in the same time enable users to communicate with the LAN in a secured way.

[For the sake of clarity and for simplifying the explanation of the System, the following terms are used: WAN: Wide Area Network (10); DMZ: De-5 Militarized Zone (20); LAN: Local Area Network (30); LAN Server: Server running in the LAN (31); DMZ Server: Server running in the DMZ (21); DMZ Stack Pool Service: Stores and handles Client's Requests (22) in the DMZ; Client Request: HTTP/HTTPS (Web browser)/]

[SSH/SFTP/FTP/FTPS/RDP/SMTP/TLS, and any other TCP/IP based protocols; 10 Client Connection Information: IP-address/Port number of the relevant destination service inside the LAN; LAN Controller: a controller running in the LAN that manages the Client Connection Information (32); Connection Binder: Handshake between two TCP/IP sockets; Service: HTTP/HTTPS (Web Server)/SSH/SFTP/FTP/FTPS/RDP/SMTP/TLS, and any other TCP/IP 15 based services.]

*For the sake of clarity and for simplifying the explanation of the System, the following terms are used: WAN: Wide Area Network (10); DMZ: De-Militarized Zone (20); LAN: Local Area Network (30); LAN Server: Server running in the LAN (31); DMZ Server: Server running in the DMZ (21); DMZ Stack Pool Service: Stores and handles Client's Requests (22) in the DMZ; Client Request: HTTP/HTTPS (Web browser)/SSH/SFTP/FTP/FTPS/RDP/SMTP/TLS, and any other TCP/IP based protocols; Client Connection Information: IP-address/Port number of the relevant destination service inside the LAN; LAN Controller: a controller running in the LAN that manages the Client Connection Information (32); Connection Binder: Handshake between two TCP/IP sockets; Service: HTTP/HTTPS (Web Server)/SSH/SFTP/FTP/FTPS/RDP/SMTP/TLS, and any other TCP/IP based services.*

The objective of this invention is to provide a secured connection between servers in the LAN and the clients in the WAN.

FIG. 1 describes the main components of the System. The LAN (30) includes the Service (33), the LAN Server (31) and the LAN Controller (32); The DMZ (20) includes the DMZ Server (21), the DMZ Stack Pool Service (22); and the WAN (10) that by its nature includes the clients and the 'outside' world. In addition, FIG. 1 describes the connections between the System components.

The connections between the System components will be described while [10] describing the System flow. The connection flow of the System is as [follow] *follows*:

First step: The Client Request (of the client (11)) reaches the DMZ Server (21). Second step: The DMZ Server (21) stores the Client Request in the DMZ Stack Pool Service (22). Third step: The LAN Controller (32) establishes outbound 15 TCP based connection (41) to the DMZ Stack Pool Service (22). One of the innovative aspects of the System is that the LAN Controller (32) constantly, and/or on a predefined set of time basis, checks for Client Requests stored in the DMZ Stack Pool Service (22). Fourth step: The DMZ Stack Pool Service (22) then passes the Client Connection Information, to the LAN Server (31) via 20 the LAN Controller (32).

The Fifth step: The LAN Server (31) then generates two TCP/IP connections: One connection is to the Service (33), which is the destination service, based on 5 the Client Connection Information. The second connection is an outbound connection (42) to the DMZ Server (21). In addition the LAN Server (31) creates a Connection Binder in the LAN Server between the Service (33) and the outbound connection (42). The Sixth step: The DMZ Server (21) then creates a Connection Binder in the DMZ Server between the incoming Client 10 Request (that is stored in the DMZ Stack Pool Service (22)) and the outbound connection (42) arriving from the LAN Server (31), and by that completes the route of the Client Request.

Once the Connection Binder, in the DMZ Server, binds the Client Request and [15] the outbound connection (42) arriving from the LAN Server, the Client Request is then streamed through the DMZ Server and the LAN Server over the System, and then [the] client request data (*50*) streams from the Service (33) to the Client (11). *In other words, client request data (50) is able to stream from the Service (33) to the Client (11) as a result of the net effect of the establishment of the two TCP/IP connections by the LAN server and the two connection binders.*

In accordance with this invention as described above, no administrative management is required in the LAN Server (31) to establish or maintain [5] communications after it is initially installed and configured on the LAN (30) and on the DMZ (20). The LAN Controller (32) permanently or periodically queries the DMZ Stack Pool Service (22) for incoming Client Requests. The DMZ Server (20) will accept all Client Requests and route them to the LAN-Server (31), without changing the data that the Client Requests contains. For [10] example, if a Client Request uses the HTTPS connection protocol, then the HTTPS connection protocol will be transmitted over the System, as with any other common protocols such as SSH/SFTP/FTP/FTPS/RDP/SMTP/TLS/ or any other TCP/IP based protocols.

What is claimed:

1. A system for reverse access, said system comprising:

a De-Militarized Zone (DMZ) Stack Pool Service *executing on a device so that the DMZ Stack Pool Service is* located in a [De-Militarized Zone] *DMZ*, the DMZ Stack Pool Service being [arranged] *configured* to store requests received from a client, wherein said requests are stored at [the] *a* TCP/IP level *using a TCP/IP protocol*;

a local area network (LAN) Controller *located in a LAN, the LAN Controller being* configured to check for existence *of the requests* in said DMZ Stack Pool Service [of said requests], wherein said checking is performed at the TCP/IP level [and said LAN Controller is located in a LAN]; and a DMZ server configured to receive said requests from a LAN server of said LAN, and, *responsive to the requests,* to [route said requests] *stream client request data,* to said client, wherein *the* receiving and [routing] *streaming* by said DMZ server occurs at the TCP/IP level *using the TCP/IP protocol*;

wherein [said DMZ Stack Pool Service, said LAN Controller, and] said DMZ server [do] *does* not change the data of said requests and the system requires no administrative management after initial installation and configuration.

2. The system of claim 1, wherein computer programs and sensitive data of said LAN server reside only in the LAN.

3. A method for reverse access, said method comprising:

storing requests received from a client[, wherein said requests are stored] in a De-Militarized [zone] *Zone* (DMZ) Stack Pool Service at [the] *a* TCP/IP level *using a TCP/IP protocol*, wherein said DMZ Stack Pool Service is [located] *executing on a device* in a [De-Militarized Zone] *DMZ*;

checking, at the TCP/IP level, said DMZ Stack Pool Service for existence of said requests, wherein said checking is performed by a local area network (LAN) Controller located in a LAN; [and]

[receiving said requests] *establishing an outbound connection* from a LAN server of said LAN and routing [said requests] *client request data, responsive to said requests, by a DMZ server* to said client;

wherein said storing and routing occurs at the TCP/IP level *using the TCP/IP protocol* and said [storing and routing] *DMZ server* does not change data of said requests; and wherein said method requires no administrative management of the LAN server after initial installation and configuration.

4. The method of claim 3, wherein computer programs and sensitive data of said LAN server[.] reside only in the LAN.

*5. The method of claim 3, wherein the client request data is routed over the outbound connection.*

*6. The method of claim 3, further comprising:*

*establishing a connection from the LAN server to a destination service in the LAN that supplies the client request data, wherein the client request data is initially transmitted from a destination service in the LAN that supplies the client request data and is thereafter routed over the outbound connection.*

*7. The method of claim 3, further comprising:*

*establishing a connection from the LAN server to a destination service in the LAN that supplies the client request data; and*

*binding the connection from the LAN server to the destination service in the LAN that supplies the client request data to the outbound connection.*

*8. The method of claim 7, wherein the connection from the LAN server to the destination service in the LAN is established at a TCP/IP level to use a TCP/IP protocol.*

*9. The method of claim 3, wherein the outbound connection is established to a DMZ server.*

*10. The method of claim 9, wherein the outbound connection is further established at a TCP/IP level to use a TCP/IP protocol.*

*11. The method of claim 9, wherein the outbound connection is bound by the DMZ server to one of the requests stored in the DMZ Stack Pool Service.*

*12. The system of claim 1, wherein using the TCP/IP protocol comprises using information associated with the TCP/IP protocol.*

*13. A method for reverse access, said method comprising:*

*storing requests received from a client in a De-Militarized Zone (DMZ) Stack Pool Service at a TCP/IP level using a TCP/IP level-based protocol, wherein said DMZ Stack Pool Service is executing on a device in a DMZ;*

*checking, at the TCP/IP level, said DMZ Stack Pool Service for existence of said requests, wherein said checking is performed by a local area network (LAN) Controller located in a LAN;*

*establishing an outbound connection from a LAN server of said LAN and routing by a DMZ server, client request data, responsive to said requests, to said client;*

*wherein said storing and routing occurs at the TCP/IP level using a TCP/IP level-based protocol and said DMZ server does not change data of said requests; and*

*wherein said method requires no administrative management of the LAN server after initial installation and configuration.*

*14. A system for reverse access, said system comprising:*

*a De-Militarized Zone (DMZ) Stack Pool Service executing on a device so that the DMZ Stack Pool Service is located in a DMZ, the DMZ Stack Pool Service being configured to store requests received from a client, wherein said requests are stored at a TCP/IP level;*

*a local area network (LAN) Controller located in a LAN, the LAN Controller being configured to check for existence of the requests in said DMZ Stack Pool Service, wherein said checking is performed at the TCP/IP level; and*

*a DMZ server configured to receive said requests from a LAN server of said LAN, and, responsive to the requests, to stream client request data, to said client, wherein the receiving and streaming by said DMZ server occurs at the TCP/IP level;*

*wherein said DMZ server does not change the data of said requests and the system requires no administrative management after initial installation and configuration.*

* * * * *